Nov. 13, 1923.
J. M. ALLEN
1,474,313
STORAGE BATTERY
Filed Nov. 29, 1920
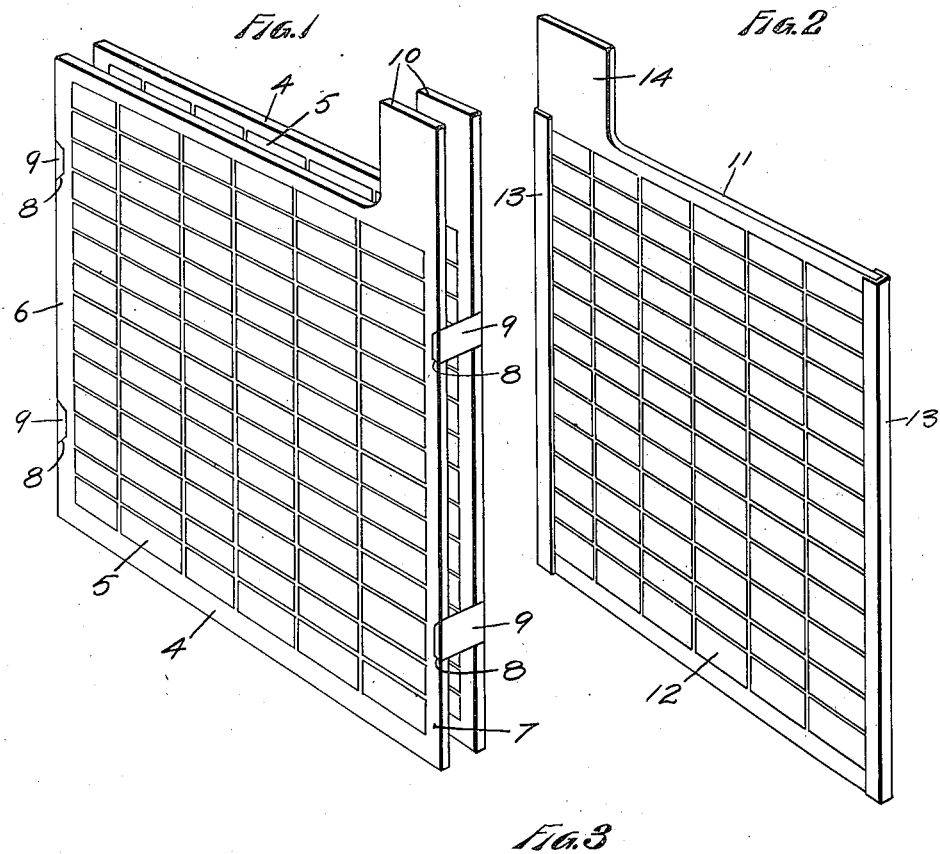
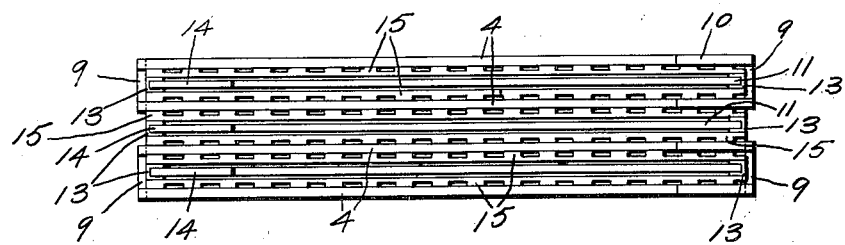
INVENTOR
JAMES M. ALLEN
BY Edward E. Lingan
ATTY.

Patented Nov. 13, 1923.

1,474,313

UNITED STATES PATENT OFFICE.

JAMES M. ALLEN, OF ST. LOUIS, MISSOURI, ASSIGNOR TO JAMES M. ALLEN, FRED P. SMITH, AND FREDERICK D. TUCKER, AS TRUSTEES FOR THE SMITH-ALLEN BATTERY COMPANY, OF ST. LOUIS, MISSOURI.

STORAGE BATTERY.

Application filed November 29, 1920. Serial No. 426,963.

*To all whom it may concern:*

Be it known that I, JAMES M. ALLEN, a citizen of the United States, and resident of the city of St. Louis and State of Missouri, have invented certain new and useful Improvements in Storage Batteries, of which the following is a specification containing a full, clear, and exact description, reference being had to the accompanying drawings, forming a part hereof.

This invention relates to improvements in storage batteries and has for its primary object the construction of a storage battery wherein the positive plates are connected in pairs so as to prevent their buckling or warping.

A further object is to construct a storage battery wherein the positive plates are connected together in units of pairs with braces between the vertical edges of the connected pairs so that the plates can not buckle or warp, when the battery is subjected to extremely hard usage and a negative plate inserted between the plates composing each of the units and between adjacent units.

In the drawings:

Fig. 1 is a perspective view of a pair of positive plates showing the manner of connecting the same.

Fig. 2 is a perspective view of one of the negative plates.

Fig. 3 is a top plan view of several units showing the manner of assembling the positive and negative plates within the battery.

In the construction of my device I employ the positive plates 4. These plates are provided with a grid which is filled with active material 5, the vertical edges 6 and 7 are provided with a plurality of tapered recesses 8 in which spacing bars 9 are placed. These bars, after being placed in the recesses, are burned or welded therein, thus uniting the two plates into a unit, which is reenforced along its vertical edges so that warping or buckling will be prevented. The upper edge of the plates is provided with an extension 10, which is for the purpose of securing the plates to a crow's foot. The negative plate 11 is also provided with a grid in which active material 12 is secured. Along the vertical edges of the negative plate, are strips 13. These strips are preferably U-shaped and of hard rubber, although they may be made of any desired shape and any acid-resisting non-conductor. The upper edge of the negative plate 11 is provided with an extension 14 for securing it to a crow's foot.

The strips 13 are designed to prevent the vertical edges of the negative plates from coming in contact with the bars 9 and thus cause a short circuit. In assembling the plates for battery uses, a negative plate is inserted between a unit of positive plates, as shown in Fig. 3, the strips 13 acting as a separator for the vertical edges of the plate. The faces of the negative and positive plates are separated from each other by means of separators 15. These separators are of any desired construction. Between the adjoining positive units is inserted a negative plate, which is also separated from the positive units by means of the separators 15. These negative plates, which are inserted between the adjoining positive units, may or may not be provided with the strips 13, it being optional with the manufacturer whether to use the same or not. While I have shown the positive units connected by two bars on each of the vertical sides, I may also, if desired, bind the plates together on the bottom, or use more bars on the vertical sides. In case the plates are bound on the bottom, it will be necessary also to put a strip 13 along the bottom edge of the negative plate. The preferred construction, however, is that shown in Fig. 1. By binding the positive plates together in pairs it is practically impossible for them to warp or buckle since in order to do so both plates of the unit must bend in the same direction, and in order to do this must also bend the negative plate, as well as bend the bars 9, and it will be practically impossible to put sufficient strain on the battery to cause warping or buckling to take place.

Having fully described my invention, what I claim is:

1. A storage battery comprising a plurality of positive and negative plates, a plurality of bars for connecting the positive plates together in pairs along their vertical edges, strips extending along the vertical edges of the negative plates for preventing contact with the bars when the negative plates are placed in position, and a plurality of separators interposed between the positive and negative plates.

2. A storage battery comprising a plurality of positive and negative plates arranged alternately, a plurality of horizontally extending bars for connecting the vertical edges of the positive plates, so as to connect them together in pairs, insulating means carried by the vertical edges of the negative plates for preventing contact with said bars, and separators interposed between the positive and negative plates.

In testimony whereof, I have signed my name to this specification.

JAMES M. ALLEN.